United States Patent
Hildebrandt et al.

(10) Patent No.: US 7,427,983 B1
(45) Date of Patent: Sep. 23, 2008

(54) VISUAL COMMUNICATION SYSTEM

(75) Inventors: Peter W. Hildebrandt, Duluth, GA (US); Ian G. Hutchinson, Suwanee, GA (US); Scott E. Wilson, Kailua-Kona, HI (US); Guy L. Williams, Yamhill, OR (US); Jake Mintz, Portland, OR (US); Stephen G. Brown, Vancouver, WA (US); Marie Cote, Québec (CA); James E. Michalski, Tucson, AZ (US); Michael H. Dunn, Dunwoody, GA (US)

(73) Assignee: Steelcase Development Corporation, Grand Rapids, MI (US)

( * ) Notice: Subject to any disclaimer, the term of this patent is extended or adjusted under 35 U.S.C. 154(b) by 180 days.

(21) Appl. No.: 10/449,336

(22) Filed: May 30, 2003

Related U.S. Application Data

(60) Provisional application No. 60/385,059, filed on Jun. 2, 2002, provisional application No. 60/385,114, filed on Jun. 2, 2002, provisional application No. 60/385,062, filed on Jun. 2, 2002, provisional application No. 60/385,060, filed on Jun. 2, 2002, provisional application No. 60/385,061, filed on Jun. 2, 2002.

(51) Int. Cl.
*G06F 3/042* (2006.01)
(52) U.S. Cl. .................. 345/175; 345/173; 345/174; 178/18.01; 178/18.03; 178/18.06
(58) Field of Classification Search ......... 345/156–179; 178/18.01–18.06, 19.01–19.06
See application file for complete search history.

(56) References Cited

U.S. PATENT DOCUMENTS

| | | |
|---|---|---|
| 4,587,568 A | 5/1986 | Takayama et al. |
| 4,667,254 A | 5/1987 | Araki et al. |
| 4,670,794 A | 6/1987 | Araki et al. |
| 4,725,889 A | 2/1988 | Yaniv et al. |
| 4,725,890 A | 2/1988 | Yaniv et al. |
| 4,727,431 A | 2/1988 | Nakamura et al. |
| 4,728,803 A | 3/1988 | Catchpole et al. |
| 4,739,414 A | 4/1988 | Pryor et al. |
| 4,751,584 A | 6/1988 | Midorikawa |
| 4,755,882 A | 7/1988 | Toyota |
| 4,760,465 A | 7/1988 | Yamazaki |
| 4,766,500 A | 8/1988 | Yaniv et al. |

(Continued)

FOREIGN PATENT DOCUMENTS

CA 2350152 A1 12/2002

(Continued)

OTHER PUBLICATIONS

"Hawkeye 480C and Hawkeye CAM," Smart Technologies (Oct. 1, 2000).

*Primary Examiner*—Vijay Shankar
(74) *Attorney, Agent, or Firm*—Rader, Fishman & Grauer, PLLC

(57) ABSTRACT

A visual communication system that is suitable for use in connection with a display surface is disclosed. The system includes a camera or other data-capturing device that can be remotely positioned from the display surface. A control unit receives image data from the camera or data-capturing device and processes the image data to create an electronic image of the display surface.

44 Claims, 12 Drawing Sheets

U.S. PATENT DOCUMENTS

| | | | |
|---|---|---|---|
| 4,797,106 A | 1/1989 | Umehara et al. |
| 4,797,107 A | 1/1989 | Hatta et al. |
| D300,041 S | 2/1989 | Kurozumi et al. |
| 4,803,564 A | 2/1989 | Sakai |
| D300,150 S | 3/1989 | Ishii |
| 4,821,335 A | 4/1989 | Yamazaki et al. |
| 4,858,021 A | 8/1989 | Toyota |
| 4,903,012 A | 2/1990 | Ohuchi |
| 4,979,027 A | 12/1990 | Sakai |
| 5,023,408 A | 6/1991 | Murakami et al. |
| 5,063,460 A | 11/1991 | Mutze et al. |
| 5,072,412 A | 12/1991 | Henderson et al. |
| 5,073,926 A | 12/1991 | Suzuki et al. |
| 5,146,345 A | 9/1992 | Yamashita et al. |
| D330,042 S | 10/1992 | Yamaguchi et al. |
| 5,181,015 A | 1/1993 | Marshall et al. |
| 5,181,104 A | 1/1993 | Sugishima et al. |
| 5,233,687 A | 8/1993 | Henderson, Jr. et al. |
| 5,235,363 A | 8/1993 | Vogeley et al. |
| 5,239,373 A * | 8/1993 | Tang et al. ............... 348/14.01 |
| 5,274,362 A | 12/1993 | Potvin |
| 5,299,033 A | 3/1994 | Watanabe et al. |
| 5,374,971 A | 12/1994 | Clapp et al. |
| 5,394,521 A | 2/1995 | Henderson, Jr. et al. |
| 5,422,693 A | 6/1995 | Vogeley et al. |
| 5,448,263 A | 9/1995 | Martin |
| 5,506,999 A | 4/1996 | Skillman et al. |
| 5,525,764 A | 6/1996 | Junkins et al. |
| 5,528,290 A | 6/1996 | Saund |
| 5,533,183 A | 7/1996 | Henderson, Jr. et al. |
| RE35,329 E | 9/1996 | Murakami et al. |
| 5,581,637 A | 12/1996 | Cass et al. |
| 5,583,323 A | 12/1996 | Zurstadt et al. |
| 5,610,730 A | 3/1997 | Osipchuk |
| 5,734,417 A | 3/1998 | Yamamoto et al. |
| 5,790,114 A | 8/1998 | Geaghan et al. |
| 5,818,425 A * | 10/1998 | Want et al. ............... 345/158 |
| 5,831,602 A * | 11/1998 | Sato et al. ............... 345/175 |
| 5,856,879 A | 1/1999 | Suzuki et al. |
| 5,859,427 A | 1/1999 | Horie et al. |
| 5,863,209 A | 1/1999 | Kim |
| 5,894,306 A | 4/1999 | Ichimura |
| 5,903,252 A | 5/1999 | Ogata |
| 5,926,605 A | 7/1999 | Ichimura |
| 5,933,132 A | 8/1999 | Marshall et al. |
| 5,933,191 A | 8/1999 | Ariga et al. |
| 5,999,278 A | 12/1999 | Suzuki et al. |
| 6,000,946 A | 12/1999 | Snyders et al. |
| 6,067,080 A | 5/2000 | Holtzman |
| 6,100,538 A * | 8/2000 | Ogawa ............... 250/559.29 |
| 6,100,877 A | 8/2000 | Chery et al. |
| 6,101,288 A | 8/2000 | Kang |
| 6,104,387 A | 8/2000 | Chery et al. |
| 6,111,565 A | 8/2000 | Chery et al. |
| 6,115,146 A | 9/2000 | Suzuki et al. |
| 6,122,865 A | 9/2000 | Branc et al. |
| 6,124,847 A | 9/2000 | Chery et al. |
| 6,147,681 A | 11/2000 | Chery et al. |
| 6,177,927 B1 | 1/2001 | Chery et al. |
| 6,181,378 B1 | 1/2001 | Horie et al. |
| 6,188,493 B1 | 2/2001 | Esaki et al. |
| 6,191,778 B1 | 2/2001 | Chery et al. |
| 6,209,266 B1 | 4/2001 | Branc et al. |
| 6,211,863 B1 | 4/2001 | Chery et al. |
| 6,212,547 B1 | 4/2001 | Ludwig et al. |
| 6,232,962 B1 | 5/2001 | Davis et al. |
| 6,256,063 B1 | 7/2001 | Saito et al. |
| 6,310,615 B1 | 10/2001 | Davis et al. |
| 6,318,825 B1 | 11/2001 | Carau, Sr. |
| 6,335,724 B1 | 1/2002 | Takekawa et al. |
| 6,337,681 B1 | 1/2002 | Martin |
| D458,230 S | 6/2002 | Hand et al. |
| 6,414,673 B1 * | 7/2002 | Wood et al. ............... 345/173 |
| 6,421,042 B1 | 7/2002 | Omura et al. |
| 6,427,389 B1 | 8/2002 | Branc et al. |
| 6,429,856 B1 | 8/2002 | Omura et al. |
| 6,430,567 B2 | 8/2002 | Burridge |
| 6,441,807 B1 * | 8/2002 | Yamaguchi ............... 345/173 |
| 2001/0019325 A1 | 9/2001 | Takekawa |
| 2001/0030668 A1 | 10/2001 | Erten et el. |
| 2001/0046035 A1 | 11/2001 | Vanderwerf et al. |
| 2002/0008692 A1 | 1/2002 | Omura et al. |
| 2002/0016788 A1 | 2/2002 | Burridge |
| 2002/0041272 A1 | 4/2002 | Ohashi |
| 2002/0041327 A1 * | 4/2002 | Hildreth et al. ............... 348/42 |
| 2002/0067520 A1 | 6/2002 | Brown et al. |
| 2002/0082998 A1 | 6/2002 | Sastri et al. |
| 2002/0118180 A1 | 8/2002 | Martin |
| 2002/0124479 A1 | 9/2002 | Branc et al. |
| 2002/0126161 A1 | 9/2002 | Kuzunuki et al. |
| 2002/0141616 A1 | 10/2002 | Cox et al. |
| 2002/0145595 A1 * | 10/2002 | Satoh ............... 345/173 |
| 2002/0149808 A1 | 10/2002 | Pilu |
| 2002/0163505 A1 | 11/2002 | Takekawa |
| 2007/0008303 A1 * | 1/2007 | Kitaguchi et al. ............... 345/173 |

FOREIGN PATENT DOCUMENTS

| | | |
|---|---|---|
| EP | 0379354 A2 | 7/1990 |
| EP | 0749037 A2 | 12/1996 |
| EP | 10210356 A1 | 8/1998 |
| EP | 0884890 A1 | 12/1998 |
| EP | 0895189 A1 | 2/1999 |
| EP | 0701225 B1 | 12/1999 |
| EP | 0982923 A2 | 3/2000 |
| EP | 0996276 A2 | 4/2000 |
| EP | 1028003 A1 | 8/2000 |
| EP | 1083477 A2 | 3/2001 |
| EP | 1083514 A1 | 3/2001 |
| EP | 1089548 A2 | 4/2001 |
| EP | 1132852 A1 | 9/2001 |
| JP | 61026127 A1 | 2/1986 |
| JP | 63228321 A1 | 9/1988 |
| JP | 3075914 A1 | 3/1991 |
| JP | 3174578 A1 | 7/1991 |
| JP | 04081159 A1 | 3/1992 |
| JP | 05197510 A1 | 8/1993 |
| JP | 07107220 A1 | 10/1993 |
| JP | 05251359 A1 | 4/1995 |
| WO | WO 98/14888 A2 | 4/1998 |
| WO | WO 99/59130 A2 | 11/1999 |
| WO | WO 01/46941 A1 | 6/2001 |
| WO | WO 02/086618 A1 | 10/2002 |

\* cited by examiner

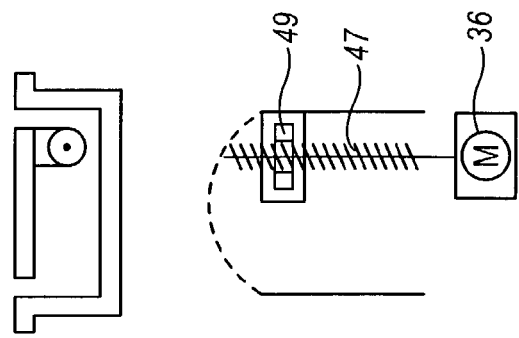
FIG. 3A
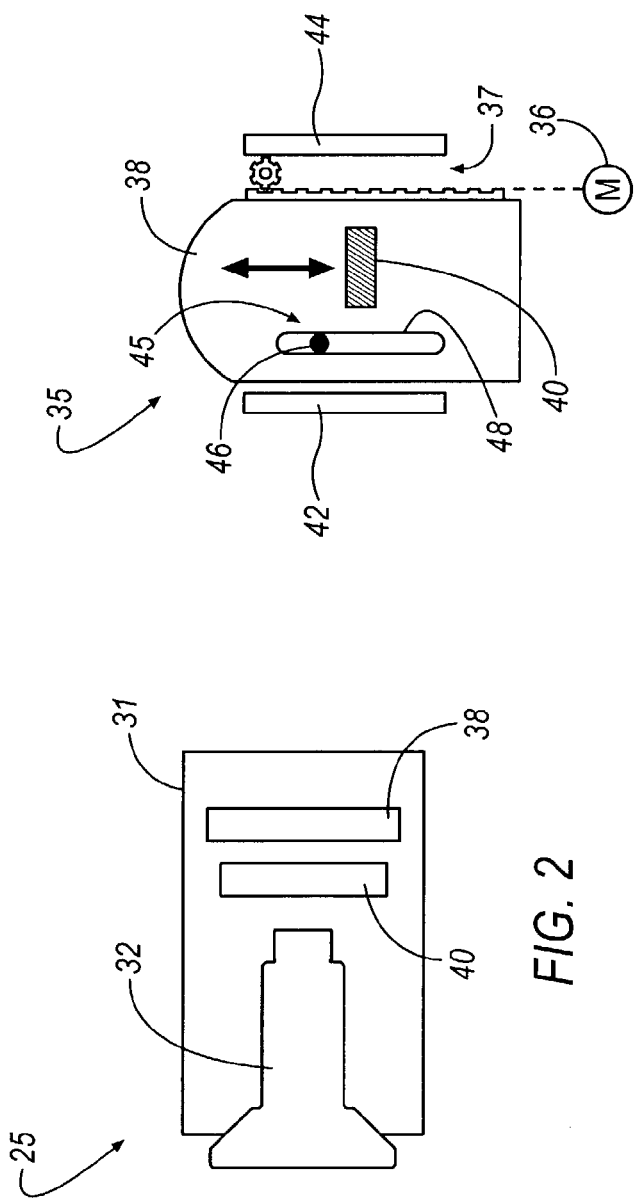
FIG. 3
FIG. 2
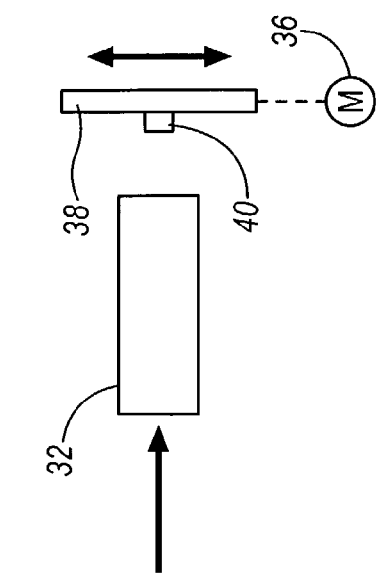
FIG. 4

VISUAL COMMUNICATION SYSTEM

RELATED APPLICATIONS

This application claims priority to U.S. provisional patent applications 60/385,059, 60/385,114, 60/385,062, 60/385,060 and 60/385,061, each individually filed on Jun. 2, 2002, which are incorporated herein by reference in their entirety.

BACKGROUND OF THE INVENTION

1. Field of the Invention

The present invention relates to electronic image acquisition and more particularly to a visual communication system employing, inter alia, visual observation, data-capturing, data transferring and/or data reproducing features.

2. Description of the Related Art

Communication display surfaces, such as whiteboards, blackboards and flipcharts, are commonly used to convey visual information. The visual information conveyed on these display surfaces may take a number of different forms, including without limitation, hand-written notes, images projected onto a display surface, and tangible items secured to a display surface, such as documents, adhesive notes and photographs. Depending on where the display surface is located or positioned, information may be displayed and then manipulated, removed, stored, and/or transferred from display surface to accommodate several users. In the past, if the information on a display surface is to be saved, the information was commonly transcribed by hand before removal. For these and other reasons, it is desirable to provide a means for conveniently capturing and using information and images associated with a display surface.

SUMMARY OF THE INVENTION

A visual communication system that is suitable for use in connection with a display surface is disclosed. The system includes a camera or other data-capturing device that can be remotely positioned from the display surface. A control unit receives image data from the camera or data-capturing device and processes the image data to create an electronic image of the display surface. The invention takes the form of numerous embodiments associated with the aforementioned system and methods pertaining to the system.

BRIEF DESCRIPTION OF THE DRAWINGS

Embodiments of the invention will now be described, by way of example, with reference to the accompanying drawings, wherein:

FIG. 2 is a schematic that generally illustrates an embodiment of a camera suitable for use in connection with a visual communication system such as shown in FIG. 1.

FIG. 3 is a schematic that generally illustrates a front view of the components of an embodiment of a camera suitable for use in a visual communication system such as shown in FIG. 1.

FIG. 3a is a schematic that generally illustrates another embodiment of a camera.

FIG. 4 is a schematic that generally illustrates a side view of the components of an a camera suitable for use in connection with embodiments of the present invention.

DETAILED DESCRIPTION

Figure 1:
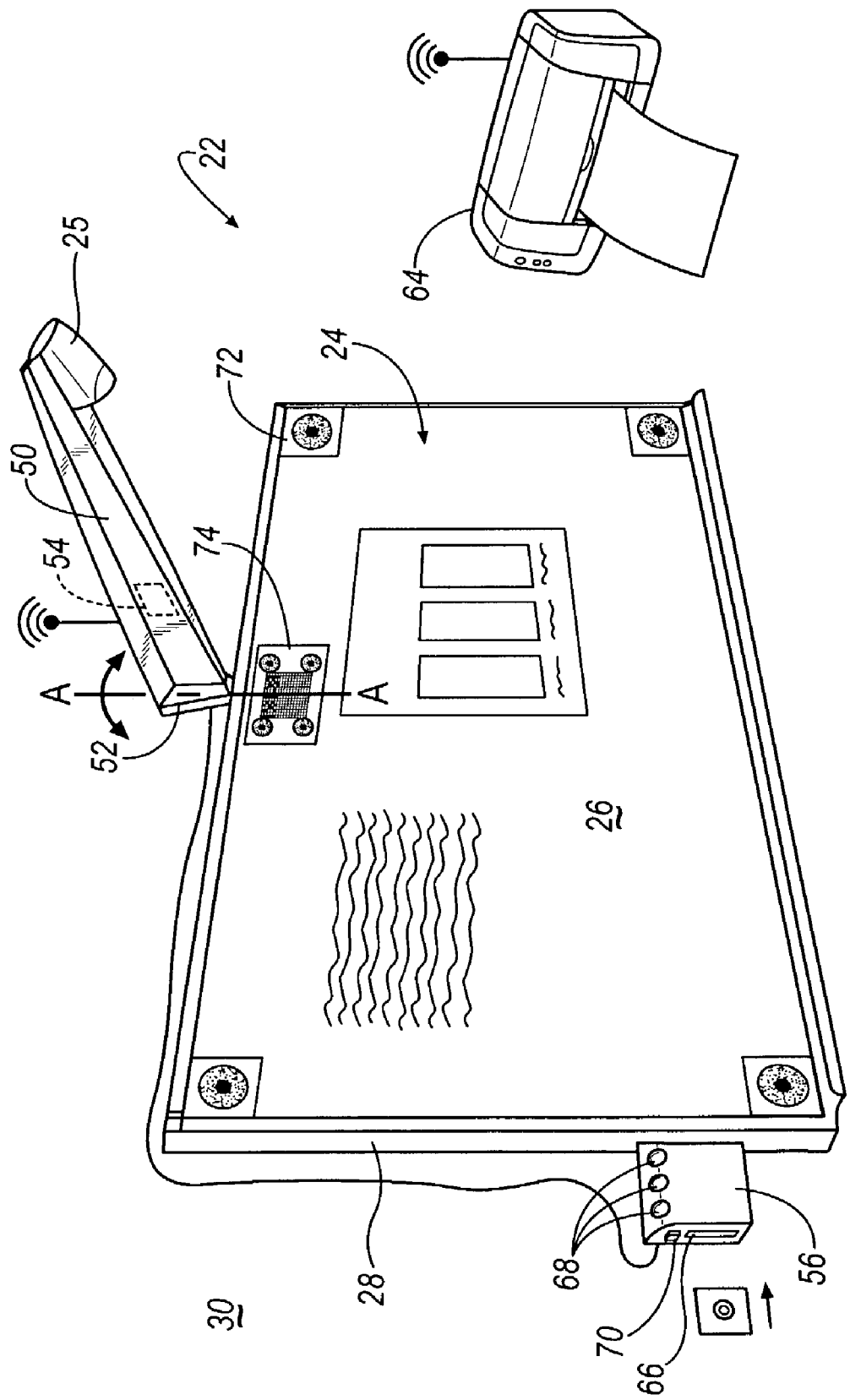
FIG. 1 is a perspective view of a display surface employing a visual communication system according to an embodiment of the invention.

Referring now to the drawings, illustrative embodiments of the present invention are shown in detail. Although the drawings represent some embodiments of the invention, the drawings are not necessarily to scale and certain features may be exaggerated to better illustrate and explain the present invention. Further, the embodiments set forth herein are not intended to be exhaustive or otherwise limit or restrict the invention to the precise configurations shown in the drawings and disclosed in the following detailed description.

Referring to FIG. 1, an embodiment of a visual communication system 22 is shown. System 22 is useful, among other things, for acquiring an image associated with a display surface 24, upon which various types of information can be presented or displayed. In an embodiment, such as that shown in FIG. 1, display surface 24 is a whiteboard that may include a generally planar board surface 26 and a peripheral boundary, which may take the form of an edge 28. The information displayed on the display surface 24 (shown here in the form of a board surface 26) may include, for example, hand-written notes, images projected onto the surface, and materials affixed or secured to the surface, such as documents, photographs and/or adhesive notes. The exemplary display surface shown in FIG. 1 is secured or mounted (permanently or temporarily) to a wall 30 or other support structure or device, including those that may be found in a meeting room, classroom, or other conference facility.

While display surface 24 is shown in FIG. 1 for illustration purposes in the context of a whiteboard, it will be appreciated that system 22 is operable with other information display means, including without limitation, chalkboards and blackboards. Where no "board" is available, display surface 24 may include, for example, an easel or track supported flipchart, a wall, butcher block paper, and/or other suitable surfaces upon which visual information may be displayed and utilized by or in connection with the system 22.

Figure 1A:
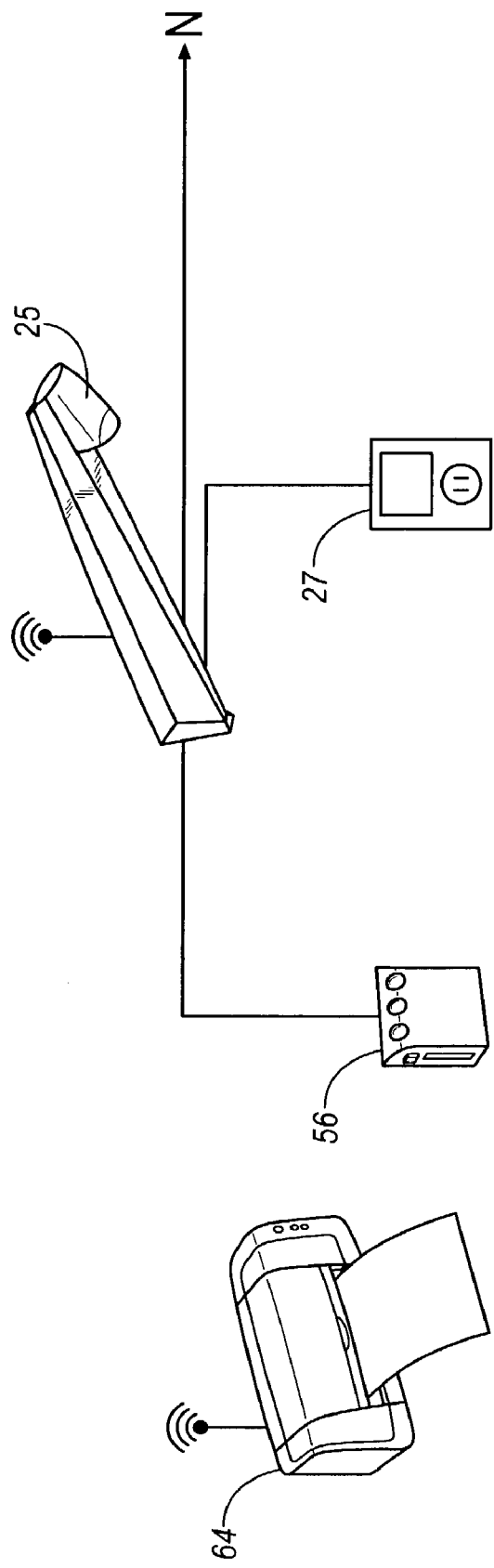
FIG. 1A is a schematic that generally illustrates a connection of elements according to an embodiment of the invention.

FIG. 1A is a schematic that generally illustrates the connection of elements according to an embodiment of the invention. As illustrated, elements of the system 22, such as the camera 25 (which may or may not include an internal control unit), are shown connected to one another. For example, without limitation, the camera 25 can be directly or indirectly connected by a wire or other connector to a network N, a power source 27 (shown here for representative purposes in the form of a representative outlet or plug), and/or a user interface 56. The camera 25 may also, for example, be wirelessly connected to other components, such as a printer 64 or one or more of the previously mentioned components. It should be noted that the means of connection (e.g., wired vs. wireless) is not typically critical to the practice of the inventive concept and the power to the system and its individual elements can be provided by a wide variety of sources, including, without limitation, electrical sources, battery sources, or other sources of power. Moreover, if desired, a physical connection can provide power and/or useful signals, data or other forms of information.

The illustrated embodiments of the system 22 include a camera 25 or other visual data-capturing device. It is understood however that the system 22 is not necessarily limited to a single camera and may instead include a plurality of cameras that work independently or in combination. Camera 25 may be of either a scanning or non-scanning (e.g., instant capture) character and can be deployed selectively with respect to display surface 24 and the associated displayed information. The camera 25 may be comprised of an integral unit or several components working in combination. Moreover, if desired for certain embodiments, the camera may also include a projection device or elements of a projection device and thus may both form (or partially form) and capture elements of an image upon and from a display surface 24. If desired, a light bulb may be included to provide surface illumination.

Figure 5:
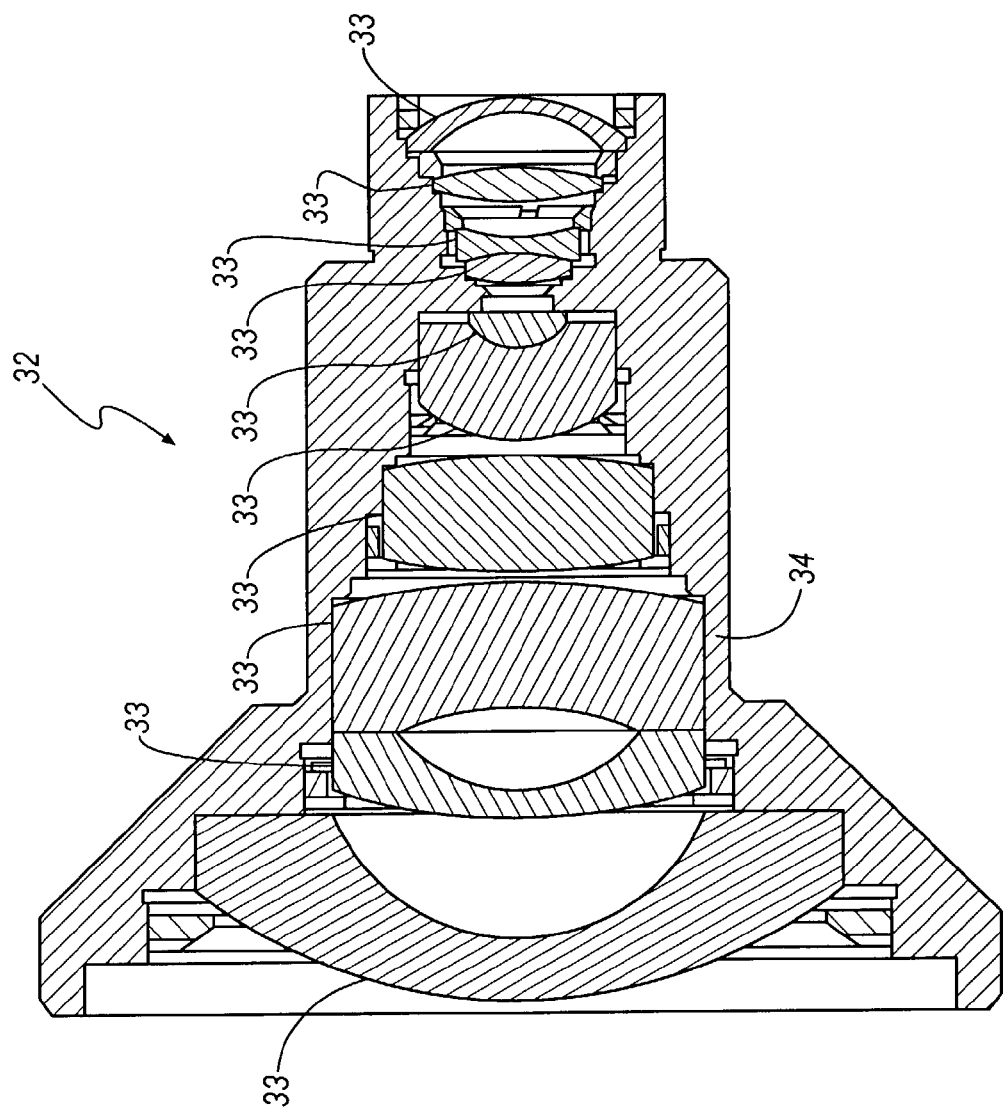
FIG. 5 is a cross-sectional view of a camera lens suitable for use in connection with embodiments of the visual communication system of the present invention.

An embodiment of a camera 25 is shown schematically in FIGS. 2-4 as including a housing 31 within which is disposed an appropriate imaging lens 32. If desired, the imaging lens 32 can be positioned and shaped to capture a full or nearly substantially full-surface view of display surface 24. Lens 32, an embodiment of which is shown in more further detail in FIG. 5, includes a relatively large light-capturing capability, e.g., a capability having a focal length (or f number) of approximately 4.5. In the embodiment illustrated in FIG. 5, lens 32 includes an arrangement of optically interactive lens components 33, which are shown organized in the form of to an optical stack. A housing structure 34 can surround the lens stack and may be formed as a portion of camera housing 31 or separate from housing 31 and may be disposed in the housing 31 therein. If desired, infrared (IR) filtering may be applied to the image by way of a coating applied on one or more lens components 33 within the optical stack. However, it will be appreciated that IR filtering can be provided between the lens components, on the surface of the CCD scanner device 40, or electronically in the processed image. The arrangement of lens components 33 in the optical stack may be configured to capture a relatively wide or "wide angle" image at a relatively small distance removed from the display surface 24. In one exemplary configuration, such as the configuration illustrated in FIG. 5, lens 32 can capture a full or substantially full surface image of an approximately 8-foot wide (or greater) display surface 24 from, for example, a distance of about 30 inches.

In a particular embodiment, camera 25 includes a scanning system 35 having a selectively operable drive unit 36, such as a stepper motor, and a sled 38 that may be moved under precision control by drive unit 36 through a drive mechanism 37 disposed between or about the drive unit 36 and sled 38 (for example, as shown in FIGS. 3 and 4). In one particular embodiment, the sled 38 includes an optical-to-electronic imager 40, such as a linear or area charged coupling device (CCD), is moveable about or behind lens 34, and can collect image information from the rear surface of lens 34.

While certain embodiments of a camera 25 are schematically shown in the corresponding figures, the camera should not be so limited. For example, the drive mechanism 37 illustrated in FIGS. 2-4 is intended to generally represent an appropriate operable or driving connection that exists between sled 38 and drive unit 36. Accordingly, various drive mechanisms may be employed between drive unit 36 and sled 38, including without limitation, a rack and pinion type arrangement, a screw or worm drive arrangement and various forms of rough or precision linear positioners.

In a particular embodiment, sled 38 is moveably mounted in housing 31 between a pair of stationary guide tracks 42, 44 for movement linearly and/or reciprocatingly behind lens 34. A stabilizer mechanism 45 may be provided to inhibit wobbling of sled 38 as it moves on guide tracks 42, 44. In the configuration shown in FIG. 3, stabilizer mechanism 45 includes a pin 46 mounted to housing 32 that is slidingly received with an appropriate clearance fit within an elongated slot 48 in sled 38. FIG. 3A illustrates another embodiment of the configuration that employs a screw 47 or screw drive in connection with a drive unit 36 (e.g., a stepper motor). Such a configuration may, for instance, include a nut 47 that is driven by the drive unit 36 and is captured in a slot or groove attached or connected to the associated image capturing device. It will be appreciated that other types of motion stabilization, such as, without limitation, software-based image stabilization, may also be employed alone or in combination with the various stabilization mechanisms.

In one mode of operation, camera 25 scans display surface 24, particularly the area within which information is displayed on display surface 24. In an embodiment, the optical-to electronic imager 40 scans the display surface one line or row at a time in a vertical or horizontal manner, much like a document scanner or photocopier. As display surface 24 is scanned, the optical-to-electronic imager 40 (such as a CCD) converts an optical image of the display surface into an electronic data-stream. In an alternative mode of operation, a fixed-area optical-to-electronic imager 40, such as a fixed-area CCD can capture a two-dimensional image of the display surface 24 at once.

Referring again to FIG. 1, camera 25 may be supported remotely from a communication display surface 24 by a support that may take the form of a cantilevered outrigger arm 50. Outrigger arm 50 is typically mounted above or in vertical proximity to the peripheral edge 28 of communication display surface 24. While the most convenient location for outrigger arm 50 is above display surface 24, it may also be deployed adjacent or in proximity to any peripheral edge of display surface 24 or even substantially over the displayed information where no peripheral edge is defined. If desired, the camera 25 and/or outrigger arm 50 may be connected to a ceiling or a support positioned above the display 24 surface.

In the illustrative embodiment shown in FIG. 1, outrigger arm 50 is mounted to a surface or wall 30 disposed slightly above the display surface 24 and may be positioned such that it extends outwardly and upwardly over display surface 24. A pivot mechanism 52 may by positioned between the support (shown here as wall 30) and outrigger arm 50 to permit the outrigger arm 50 to be moved about one or more pivot axis, such as A-A. An appropriate pivot mechanism 52 (represented generically in FIG. 1) may optionally be provided between outrigger arm 50 and wall 30 to allow outrigger arm 50 to be selectively moved between an in-use position, where the camera assembly is remotely positioned in front of a display surface 24 (e.g., positioning the outrigger arm 50 upwardly and outwardly with respect to the display surface as shown in FIG. 1), and a storage position, where the outrigger arm 50 and camera 25 are moved away from a front in-use position relative to the display surface 24 and closer to or against a support, support surface, or wall 30. Depending upon the desired circumstances, outrigger arm 50 and camera 25 may be permanently affixed (e.g., wall-mounted in a conference room) or may be reconfigurable and/or maneuverable (e.g., as part of a portable unit with an outrigger arm-like mounting means.)

In an embodiment, system 22 also includes at least one control unit 54 in communication with camera 25 and at least one user interface 56 also in communication with the control unit 54. While one or more elements of a control unit 54 may be conveniently located within outrigger arm 50, as shown in FIG. 1, it will be appreciated that placement of control unit 54 (or control unit components) is not so limited and that control unit 54 or elements of a control unit may be located in many other locations, including, without limitation, proximate outrigger arm 50 or within another component of system 22, such as user interface 56.

Figure 6:
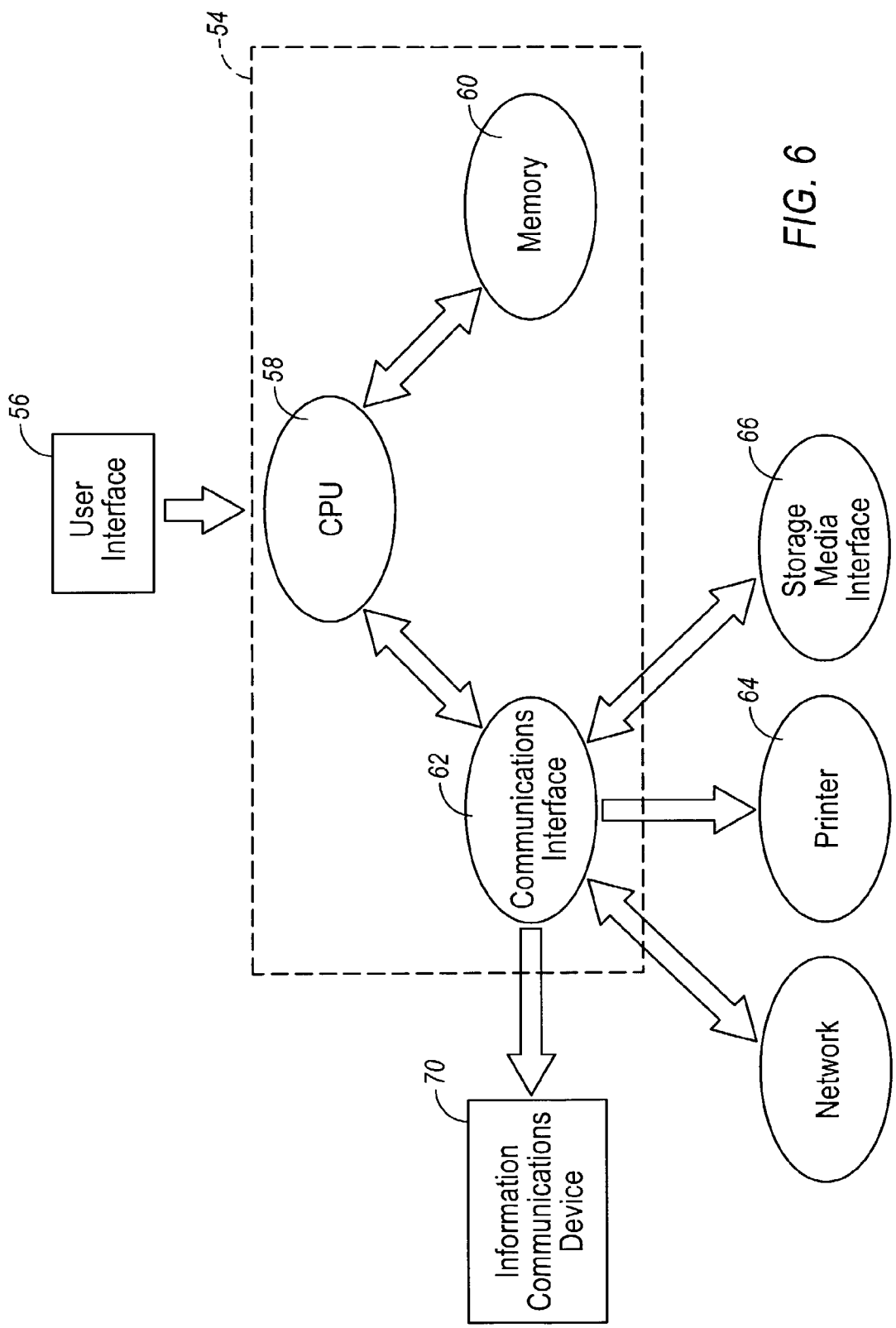
FIG. 6 is a schematic that generally illustrates in block diagram format an embodiment of a visual communication system.

Referring to an embodiment of a configuration shown in FIG. 6, control unit 54 generally includes a controller or central processing unit (identified as CPU 58) that can process image data received from camera 25 and transform or convert the image data into an electronic form or image of display surface 24. In some embodiments of the system, the controller (or CPU) 58 is comprised of two (or more) processors or CPUs. For example, the system may utilize one CPU to handle image capture and processing and another to handle and coordinate system command and control. Control unit 54 may also include a non-volatile memory 60 and/or a communications interface 62. Communications interface 62 is generally operable to receive image data from camera 25 and may transfer processed image information to one or more peripheral devices, such as, for example, a printer 64 or a storage media interface 66.

In a particular embodiment of the invention, storage media interface 66 may include a floppy diskette drive and/or CD-R drive provided within user interface 56. The drive can write image files, for example, to a standard IBM compatible PC 3.5" formatted HD diskette and/or a writable CD-ROM. The number of image that may be stored on the diskette or CD-ROM vary depending on the size of the image file. While storage media interface 66 is shown in FIG. 1 as being included within user interface 56, it will be appreciated that storage media interface 66 and user interface 56 may be comprised of two or more discrete devices. Storage media interface 56 may also be operable with other suitable storage media, including without limitation, flash memory cards, removable hard drives and optical storage media, such as CD-R, CD+RW, DVD+RW, USB keydrives, and USB-enabled flash memory.

While control unit 54 may communicate with camera 25 and peripheral devices using suitable communication cables, it is also possible for control unit 54 to communicate with other devices, including camera 25, wirelessly using Bluetooth, WIFI, and other suitable wireless communication protocols. A network interface controller may also be included in communication interface 62 to connect imaging system 22 to an appropriate network, such as a local area network. Control unit 54 may also be configured as a "Web" server, allowing a predetermined number of images stored in memory 60 to be accessed from anywhere on the network using a standard web browser or other suitable web client application. When so configured, control unit 54 may support fixed IP addressing or DHCP protocol. Access to the network may also be provided by a suitable communications cable or wirelessly using a wireless communication device.

In response to a user's request to acquire an image of display surface 24, raw image data may be acquired by a camera 25 and conveyed to control unit 54, particularly a controller or CPU 58. The controller or CPU 58 transforms or converts the raw image data into electronic images of display surface 24 in a desired file format, such as a .tiff, .JPEG, .GIF, or .PNG file. Depending on the user input provided, controller or CPU 58 may transmit the electronic image file to one or more peripheral devices, send the electronic image file over the communications network, and/or store in an internal memory for later retrieval (e.g., through a computer network such as the Web).

In a particular embodiment of the invention, user interface 56 is configured to receive a single user input to initiate imaging of display surface 24 and distribution of an electronic image. In a certain configuration, user interface 56 includes at least one action button 68 that may be selectively actuated by a user to acquire an image and to distribute the image in a predetermined manner. The term "action button" as used herein, generically describes an input device that receives a user command and electronically transfers the user command to control unit 54. Suitable action buttons include, but are not limited to, touch sensors, electromechanical switches and proximately switches. The action button may be accompanied by a visual indicator, such as an LED, which provides the user with a visual indication that an action button has been activated. Action buttons 68 conveniently allow a user to acquire and distribute an image of display surface 24 using a single step, rather than a series of steps. In addition to or in place of one or more action buttons, the system 22 may include voice recognition software and may receive instructions, such as action button type instructions, provided and effectuated by a user's voice command.

In the embodiment shown in FIG. 1, a user interface 56 is shown with three action buttons, each configured to transmit a distinct instruction signal to control unit 54 corresponding to a predetermined user request. In a particular configuration, a first action button can initiate acquisition of the image data and distribution of the image to a printer to be printed when activated by a user. For example, by activation of the first action button, the acquired image file may be transferred wirelessly to printer 64 where a hard copy of the display surface image is automatically printed without further user intervention.

In a similar configuration, a second action button can, for instance, initiate acquisition of the image data and distribution of the image to a storage media interface device when activated by a user. For example, by activation of the second action button, the acquired image file may be sent for recording on a floppy diskette or other digital storage medium contained in storage media interface 66.

In still another configuration, a third action button can initiate acquisition of the image data and distribution of the image to a memory when activated by a user. For example, by activation of the third action button, the acquired image file can be transferred to a network server for later distribution to a local or wide area communications network or the internet. Alternatively, the acquired image file may be immediately transferred across a local or wide area network to a computer server, where it can be distributed across a wider network or the Internet. Moreover, for some embodiments of the invention, the web server may be built into the system, for example, as part of the control unit or camera.

The system is not limited to the action buttons previously described and may include a plurality of action buttons. Moreover, the system can also provide a great deal of flexibility in that each of the action buttons may, if desired, be programmable to perform a specific series of instructions that are preset by a user for a single-action actuation. This way a limited number of action buttons can be set or reset to perform a series of operations that are commonly anticipated, yet with the convenience of a single actuation. For example, depressing a "printer" button three times and the "save" (to diskette) button once could be configured to produce three copies of the captured material on a printer and one copy of the image on a diskette.

Optionally, system 22 may also include an information communications device 70, such as a loudspeaker or visual display screen appropriately communicating with control unit 54 to provide information concerning operation of system 22. In a particular embodiment, information communications device 70 is a loudspeaker that audibly announces, by way of confirmation, that a specific activity requested by the user is in fact being performed, or has been performed. For example, when a user requests a printed image of display surface 24, the information communications device 70 may announce "One Copy." Likewise, when the image has been photographed, the information communications device 70 (e.g., a speaker) may announce "captured." Similarly, when the image is printed, the communications device may announce "Copy Ready." Alternatively or in combination with an audible message, operational information may be communicated using an LCD screen, for example. While an illustrative embodiment of information communications device 70 is shown in FIG. 1 as being separate from user interface 56, information communications device 70 and user interface 56 may be in the form of a single integrated unit, which may be a preferred embodiment for a number of applications.

System 22 can also include a means of calibrating the system to capture and/or process the image data and modify or "correct" the processed image to enhance, among other things, the quality and/or size of the image. Also, when system 22 is installed or positioned adjacent to display surface 24, the system may be calibrated to determine an appropriate boundary of the display surface. The enablement of such calibration, and other related adjustment considerations, will be further appreciated with reference to FIGS. 1, 7 and 8.

Figure 7:
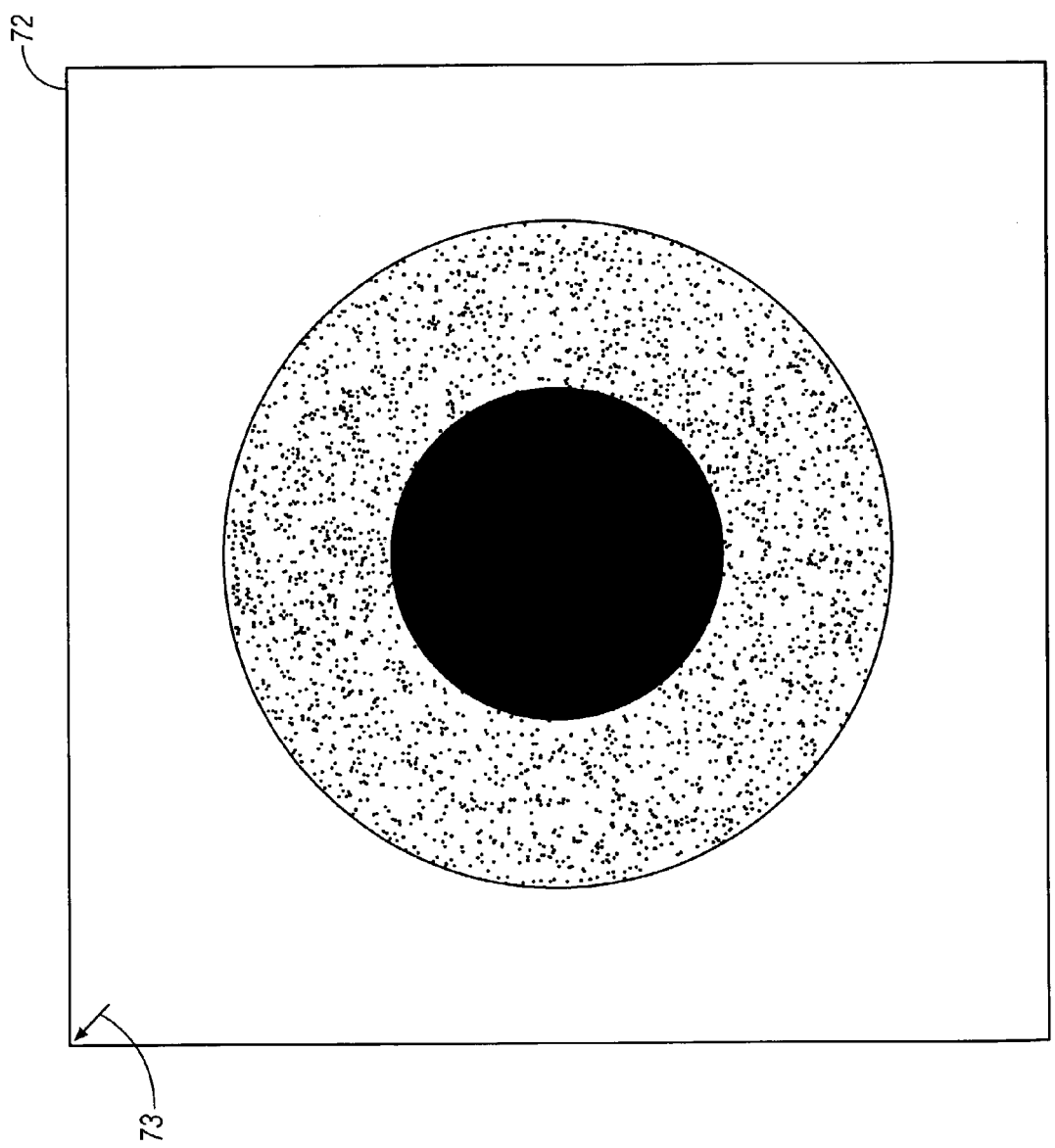
FIG. 7 is a sample calibration image according to an embodiment of the invention.
Figure 8:
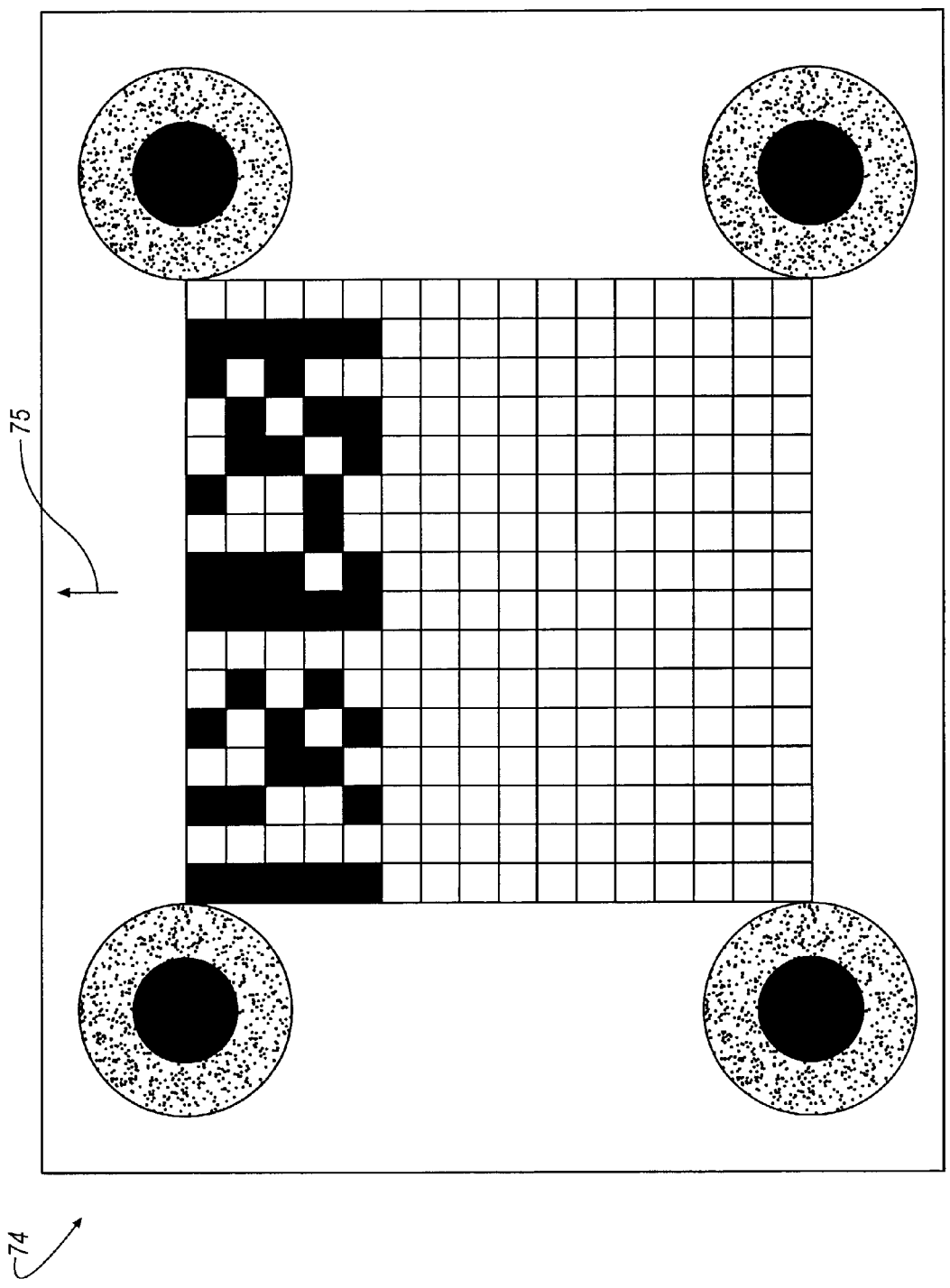
FIG. 8 is a sample calibration image according to another embodiment of the invention.

In an embodiment, command codes and other information can be uploaded into control unit 54 using calibration images that may be written, adhered or projected onto display surface 24. FIGS. 7 and 8 illustrate examples of such calibration images 72, 74. Calibration images may be displayed on display surface 24 in any suitable manner, including, for example, projecting the images upon or by adhering the images to display surface 24. The calibration images may contain various operational or control information relating to, for example, the address of a peripheral device such as a printer or network adapter, software upgrade information, control and adjustment information, and control information internal to the camera scanning structure per se, such as proper centerline defining for the camera lens, proper focusing and the like.

In one possible arrangement, one or more boundary and/or system calibration images 72, 74 are contained on sheets (e.g., sheets of paper) and are adhered at one or more designated or predetermined locations on display surface 24. For example, as shown in FIG. 1, the system may employ one or more corner boundary calibration images 72 that are viewable by camera 25 and may be used by control unit 54 to, among other things, spatially calculate/calibrate the useful display area or boundaries of display surface 24. The calibration images 72, which may take the form of a sheet such as shown in FIG. 7, may be aligned so that a particular corner 73 is aligned with a corner of the writing area or useful displace surface. In a particular application, control logic programmed into memory 60 is executed by a processor (e.g., CPU 58) to recognize calibration images 72 and processes the data derived from the calibration images to establish the functional or useful boundary of display surface 24.

Figure 12:
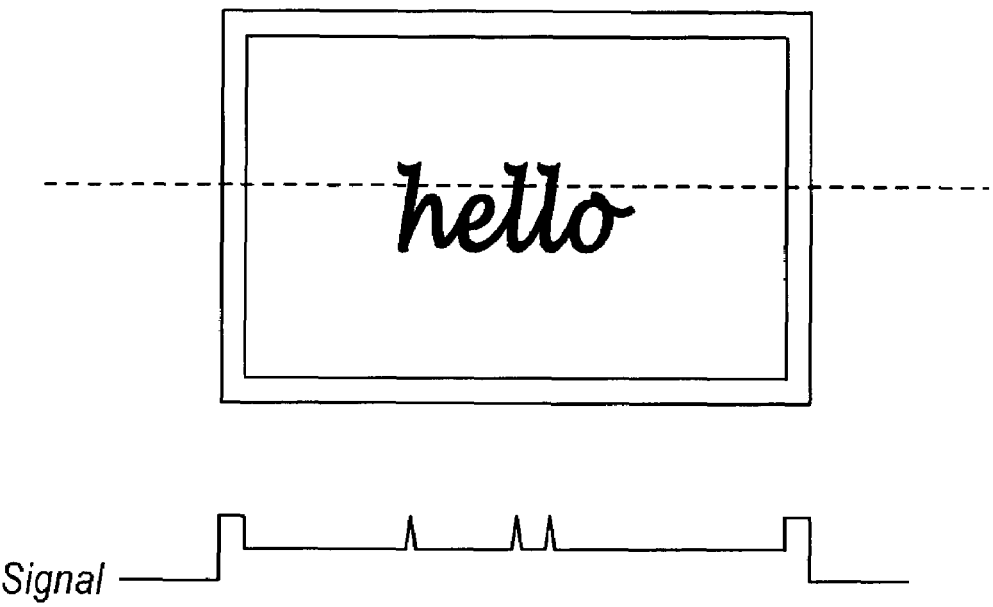
FIGS. 12 and 13 generally illustrate a method of using contrast in determining the useful boundary of a display surface.
Figure 13:
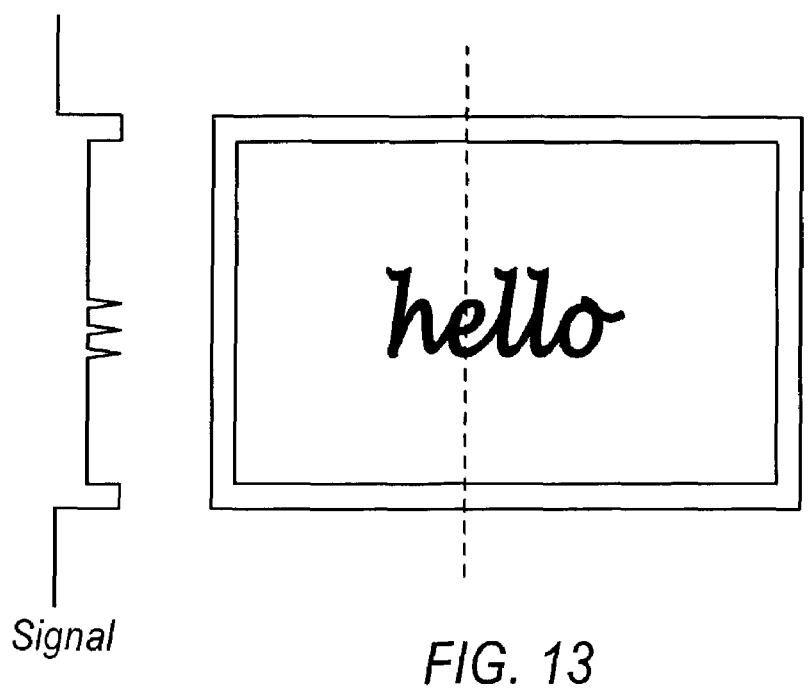

FIGS. 12 and 13 illustrate a method of using contrast in determining the useful boundary of a display surface. FIG. 12 shows how the contrast may be evaluated in a horizontal direction to ascertain the left and right boundaries of a square or rectangular display surface. Similarly, FIG. 13 illustrates how the contrast may be evaluated in a vertical direction to ascertain the upper and lower boundaries of the associated display surface.

In certain embodiments of the system, one or more system calibration images 74 (see, e.g., the image illustrated in FIG. 8) are projected onto the display surface 24 or are placed on or about the surface 24. The system calibration image 74 is preferably positioned at a location that can be captured by the camera 25 with an adequate degree of resolution with respect to the associated image 74. In the image 74 shown in FIG. 8, a line 75 can be used to align the image 74 with a portion of the display surface, e.g., the top of the writing area or the display surface. In one particular embodiment, as generally illustrated in FIG. 1, the system calibration image 74 is positioned generally at or about the top and at a mid-region or center point of the display surface 24 under the outrigger arm 50.

A system calibration image 74 may be used to transmit an encoded command to the camera. In a number of embodiments, the systems will automatically, or otherwise when activated or instructed, search for a system calibration image in a preset or anticipated location. If such an image is present, the system will capture and use the information obtained from the system calibration image to configure the system or its operation. If no such system calibration image is located, the system will typically employ preset or predetermined default system parameters.

For example, without limitation, a user might initiate a function, such as pressing a "print" button. The system 22 will search for calibration sheets. If a calibration sheet is found, for instance in an anticipated location, the system will print an image of the screen in accordance with the instructions derived from the calibration images, which will likely exclude the printing of the associated calibration sheets. If no calibration sheets are detected, the system may simply initiate a default instruction, such as the printing of the entire display surface without discrimination.

In the illustrated embodiment of FIG. 1, boundary calibration images 72 are shown positioned or tucked into the four respective corners of the display surface 24; however, such locations are not required. One or more boundary calibration images 72 and system calibration images 74 can be used together or separately, although for a number of applications they are preferably used together. In some applications, it may be appropriate to position the system calibration image 74 somewhat off-center if there is a desire to give definition to available display surface area that is not absolutely laterally centered on display surface 24. Such an off-center approach can be employed with other appropriate image processing considerations to establish a specialized, but not necessarily laterally centered display area for more focused scanning and image data collection.

Figure 9:
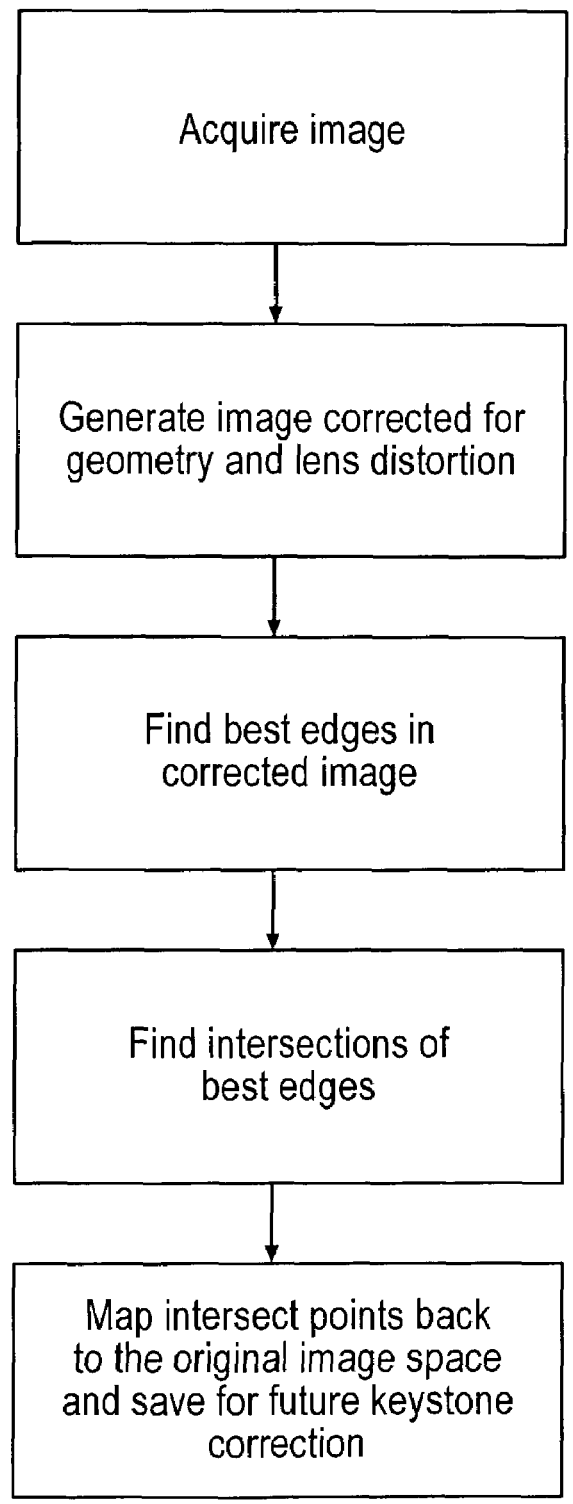
FIG. 9 is a flow diagram generally illustrating an embodiment of a method for self-calibrating a visual communication system.

In the absence of a formal calibration of system 22, such as the use of one or more calibration images, control unit 54 may include a means of self-calibrating the system 22. In a representative embodiment, control unit 54 may self-calibrate at power-up of the system or may be configured to perform a calibration periodically. Essentially, the self-calibration technique operates on the principle of a display surface having a display area encompassed by a border. The camera scans the display surface and discovers boundaries of the display area by detecting a change in the contrast in the colors of the surface area of the border. An exemplary method for self-calibrating system 22 includes, with reference to the flow diagram of FIG. 9, acquiring an image and transmitting the raw image data to CPU 58. The image data is processed by CPU 58 and corrected for geometry and lens distortion. Lines of high contrast are identified in the processed image and are used to define the peripheral edge of the display surface or useful surface area in the absence of a physically defined peripheral edge. The points of intersection between the high contrast lines, which represent the edges or corners of the usable display surface, are identified and then saved in memory 60. The stored intersection coordinates or points are used for future reference in determining the useful boundary of the calibrated display surface.

Not all communications display surfaces actually have a white surface. Some communications display surfaces have a more traditional "blackboard" for colored surface. To account for various display surface colors, one or more calibration images may be encoded with imaging data that identifies the type of display surface being used. For example, FIG. 8 illustrates an exemplary system calibration image 74. Appearing near the top of the image 74 is a grid pattern of color-coded squares. The location and color of each square is specifically selected to implement and convey at least one bit of a command code to control unit 54. To utilize the encoded information, the system calibration image 74 is scanned by camera 25 to create image data that is transmitted to control unit 54 for processing. The encoded information derived from the image data may be used to determine communications display surface properties, including, for example, the type of display surface used and its corresponding background color. "Blackboard" or colored surface type images (those other than on "white" boards) may desirably be converted or inverted to white for printing, preferably while preserving the correct colors and their relative intensities.

The encoded information displayable on calibration image 74 is not necessarily limited to the properties of display surface 24. Encoded information can be contained in calibration images that, when scanned by camera 25 and processed by control unit 54, perform specified tasks relative to operation of system 22. Such encoded information may include, for example, an IP address of a printer or WEP encryption settings for a wireless communication device in control unit 54. The encoded information may also include, among other things, a software upgrade relative to operation of system 22 and specific control/adjustment information, including information for enhancing the quality of the image, such as by correcting keystone and camera lens distortion. The information may also place elements of the system in a factory service state.

Figure 10:
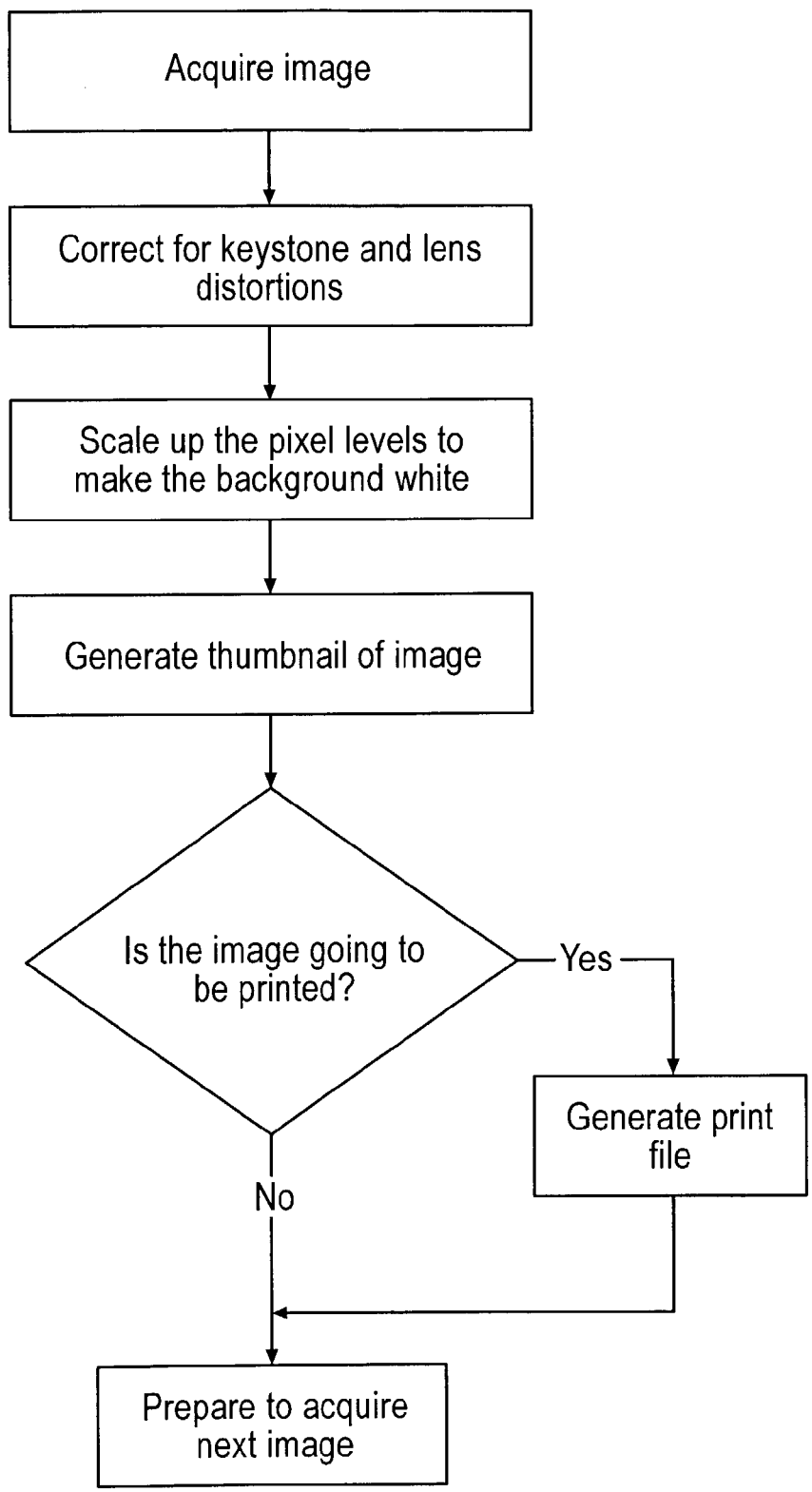
FIG. 10 is a flow diagram generally illustrating an embodiment of an image acquisition process.

FIG. 10 generally illustrates, in flow chart format, an embodiment of a method for calibrating system 22 to account for certain deficiencies in image quality, such as keystone and lens distortion issues. In response to a user request, an image of display surface 24 is acquired by camera 25 and the raw image data is communicated to control unit 54. Control unit 54 can process the image data into an electronic image (such as a two-dimensional image) and correct the image, for example, for keystone and/or lens distortion. The image pixels may then be scaled up to make the background of the image lighter so that displayed information is appropriately emphasized, and a thumbnail of the image can be generated. If the image is to be printed, such as when the first action button is activated, a print file is generated by the control unit and communicated to the printer. In the absence of a user request to print the image, control unit merely prepares system 22 for acquiring the next image.

Figure 10A:
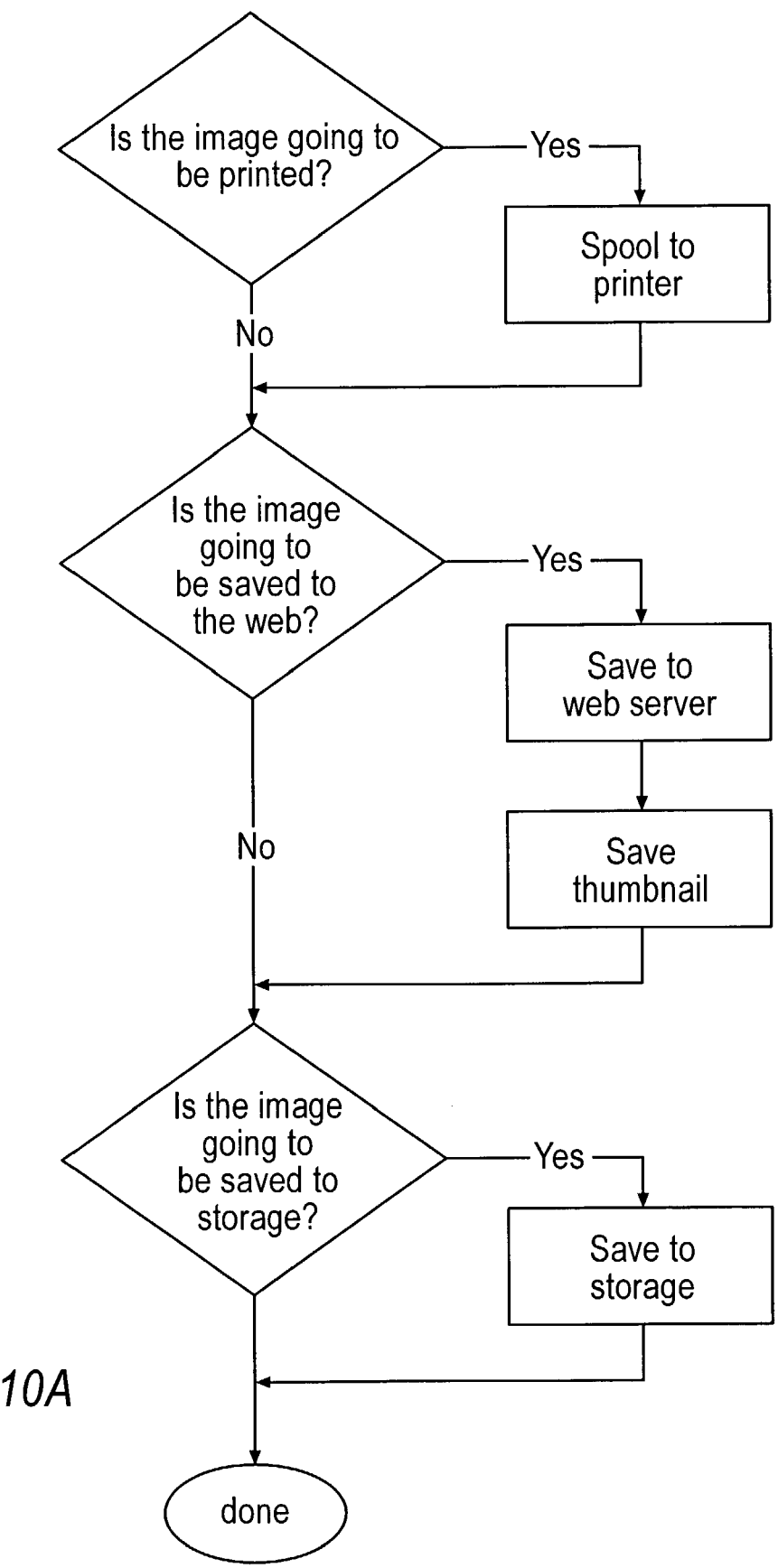
FIG. 10A is a flow diagram generally illustrating an embodiment of an image storage process.

FIG. 10A is a flow diagram that generally illustrates an embodiment of an image storage process. If desired, the process show in the flow chart of FIG. 10A can simply be an extension of the process illustrated in FIG. 10. The embodiment of the process depicted in FIG. 10A, among other things, serves to show that the specific action or process that is implemented depends on which button or user input is pushed or received and that multiple actions are contemplate. For example, without limitation, a user may push multiple buttons or push a particular button multiple times.

In a setting where there are multiple display surfaces 24 and a corresponding visual communication system 22 assigned to each display surface, each system 22 may be assigned an individual, computer readable "network" address. The addresses allow for, among other things, a remote network user to determine the location and operating statuses of the systems 22 included in the network. Such discovery requests can be made, for example, for the purpose of scheduling time on the corresponding display surfaces 24 and the like.

Figure 11:
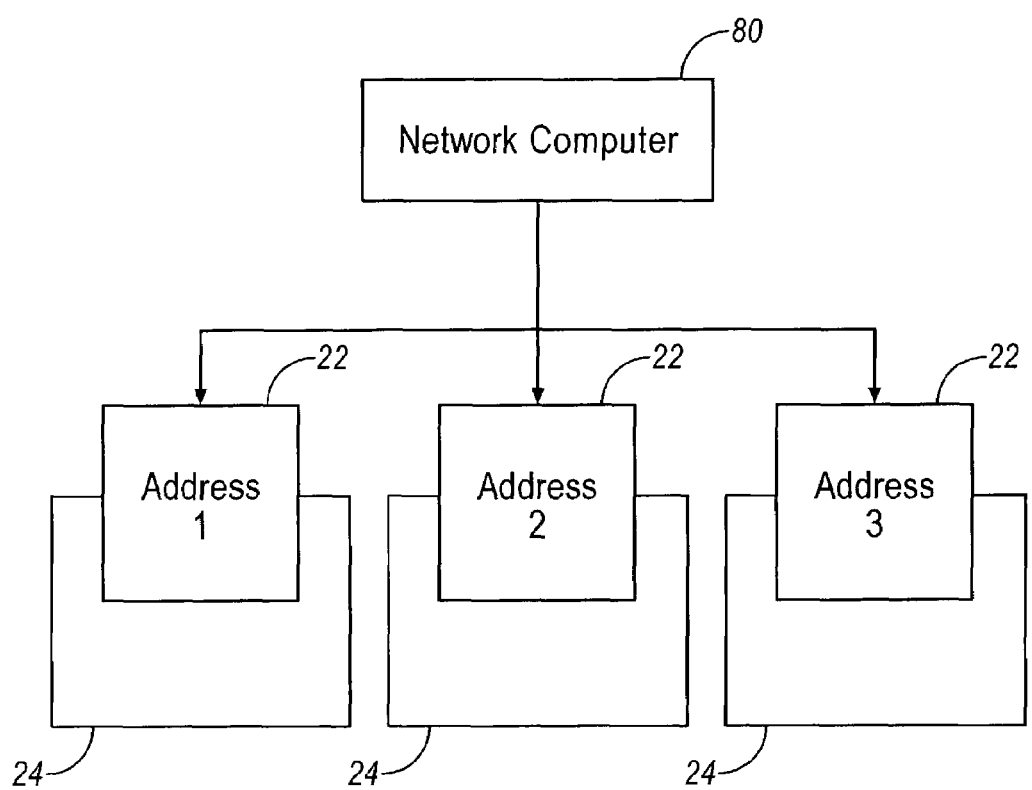
FIG. 11 a schematic that generally illustrates in block diagram format an embodiment of employing multiple visual communication systems in a network.

This feature will be appreciated with reference to FIG. 11, which illustrates a group of display surfaces 24 each configured with a system 22. The group illustrated in FIG. 11 may be provided in the same room or different rooms if so desired. In the illustrative embodiment shown in FIG. 11, each system 22 is given an appropriate network-relevant address that is readable, for example, by a remote network computer 80, such as a server computer or a PC. The network computer 80, or some other computer appropriately connected thereto, is provided with suitable device-finding software that is capable of responding to a network search request aimed at gathering status information of any and all systems 22 in the network. For example, the network computer 80 may seek information related to the number of systems 22 available in the network and their operational status, where the systems 22 are located in the network and the like. In a particular embodiment, a user may be able to seek information as to whether a particular system 22 is in use or currently available.

It will be appreciated that system 22 can be easily installed and used with existing display surfaces to capture and convey various forms of visual information. System 22 can be self-contained and does not require any external electronics, such as a personal computer, to operate. Setup of system 22 is easy and requires virtually no training to operate most common functions. The scanning feature of camera 25 produces superior clarity, even in the far corners of the image, and is easily configurable to accommodate various communications display surfaces.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A visual communication system for acquiring an image associated with a display surface, the system comprising:
   a camera deployed with respect to the display surface, wherein the camera includes a moveable optical-to-electronic imager;
   a control unit in communication with the camera, the control unit configured to receive image data from the camera and process the image data to create an electronic image of at least a portion of the display surface; and
   a user interface in communication with the control unit, the user interface configured to receive a single user input and to initiate imaging of the display surface and use or distribution of the electronic image in response to the single user input.

2. The system of claim 1, wherein the camera includes a projector or an illumination device.

3. The system of claim 1, wherein the camera includes:
   a selectively operable drive unit; and
   a sled moved tinder control by the drive unit, the moveable sled including an optical-to-electronic imager.

4. The system of claim 3 further including a drive mechanism functionally linking the drive unit to the moveable sled.

5. The system of claim 1 further including a storage media interface device.

6. The system of claim 5, wherein the storage media interface device is included in the user interface.

7. The system of claim 1, including an outrigger arm that supports the camera.

8. The system of claim 7, wherein the outrigger arm is moveable between an in-use position and a storage position.

9. The system of claim 7, wherein the control unit is included within the outrigger arm.

10. The system of claim 1, wherein the user interface includes at least one action button.

11. The system of claim 10, wherein at least one action button can be programmed by a user to perform a desired function.

12. The system of claim 10, wherein the action button is one of:
   an action button that initiates acquisition of the image data, creation of an electronic image, and transfer or distribution of the electronic image to a printer to be printed;
   an action button that initiates acquisition of the image data, creation of an electronic image, and transfer or distribution of the electronic image to a storage media interface device; and
   an action button that initiates acquisition of the image data, creation of an electronic image, and transfer or distribution of the electronic image to a network server.

13. The system of claim 1, wherein the system includes voice recognition or voice communication capabilities.

14. The system of claim 13, wherein responses are communicated by a recording of a human voice or an electronic representation of a human voice.

15. The system of claim 1, wherein an image is stored in connection with a network server and is accessible to a user through a web client application.

16. The system of claim 1, wherein the control unit includes a wireless transmitter for wirelessly transmitting the image to a remote device.

17. The system of claim 1, including a calibration image displayed on the display surface.

18. The system of claim 17, wherein the calibration image includes information concerning the calibration of the system with respect to the display surface.

19. The system of claim 17, wherein the calibration image includes information to enhance image quality.

20. The system of claim 1, including encoded information displayed on the display surface.

21. The system of claim 1, wherein the control unit includes logic rules that:
   direct the camera to acquire image data of the display surface;
   examine the image data for high-contrast transitions representing a periphery of the display surface; and
   calibrate a display area of the display surface using the high-contrast transitions.

22. The system of claim 1, wherein at least a portion of the camera is moveable relative to at least a portion of the display surface.

23. A visual communication system for acquiring an image associated with a display surface, the system comprising:
   a camera deployed with respect to the display surface, the camera including a linearly moveable optical-to-electronic imager;
   a control unit in communication with the camera, the control unit configured to receive image data from the camera and process the image data to create an electronic image of at least a portion of the display surface; and
   a user interface in communication with the control unit, the user interface configured to initiate imaging of the display surface and use or distribution of the electronic image.

24. The system of claim 23, wherein at least a portion of the camera is moveable relative to at least a portion of the display surface.

25. The system of claim 23, wherein the camera includes a projector or an illumination device.

26. The system of claim 23, wherein the camera includes:
   a selectively operable drive unit; and
   a sled moved under control by the drive unit, the moveable sled including an optical-to-electronic imager.

27. The system of claim 26 further including a drive mechanism functionally linking the drive unit to the moveable sled.

28. The system of claim 23 further including a storage media interface device.

29. The system of claim 28, wherein the storage media interface device is included in the user interface.

30. The system of claim 23, including an outrigger arm that supports the camera.

31. The system of claim 30, wherein the outrigger arm is moveable between an in-use position and a storage position.

32. The system of claim 30, wherein the control unit is included within the outrigger arm.

33. The system of claim 23, wherein the user interface includes at least one action button.

34. The system of claim 33, wherein at least one action button can be programmed by a user to perform a desired function.

35. The system of claim 33, wherein the action button is one of:

an action button that initiates acquisition of the image data, creation of an electronic image, and transfer or distribution of the electronic image to a printer to be printed;

an action button that initiates acquisition of the image data, creation of an electronic image, and transfer or distribution of the electronic image to a storage media interface device; and an action button that initiates acquisition of the image data, creation of an electronic image, and transfer or distribution of the electronic image to a network server.

36. The system of claim 23, wherein the system includes voice recognition or voice communication capabilities.

37. The system of claim 36, wherein responses are communicated by a recording of a human voice or an electronic representation of a human voice.

38. The system of claim 23, wherein an image is stored in connection with a network server and is accessible to a user through a web client application.

39. The system of claim 23, wherein the control unit includes a wireless transmitter for wirelessly transmitting the image to a remote device.

40. The system of claim 23, including a calibration image displayed on the display surface.

41. The system of claim 40, wherein the calibration image includes information concerning the calibration of the system with respect to the display surface.

42. The system of claim 40, wherein the calibration image includes information to enhance image quality.

43. The system of claim 23, including encoded information displayed on the display surface.

44. The system of claim 23, wherein the control unit includes logic rules that:

direct the camera to acquire image data of the display surface;

examine the image data for high-contrast transitions representing a periphery of the display surface; and calibrate a display area of the display surface using the high-contrast transitions.

* * * * *